United States Patent [19]

Rainey

[11] 4,256,770
[45] Mar. 17, 1981

[54] PRESERVATION OF PERISHABLE COMESTIBLES

[76] Inventor: Don E. Rainey, 4525 NE. 21st Ave., Ft. Lauderdale, Fla. 33308

[21] Appl. No.: 768,756

[22] Filed: Feb. 14, 1977

Related U.S. Application Data

[63] Continuation of Ser. No. 698,932, Jun. 23, 1976, abandoned, which is a continuation of Ser. No. 522,144, Nov. 8, 1974, abandoned, which is a continuation of Ser. No. 394,810, Sep. 6, 1973, abandoned.

[51] Int. Cl.³ .............................................. A23B 7/00
[52] U.S. Cl. .................................... 426/124; 426/419; 206/204
[58] Field of Search ............... 426/106, 108, 124, 393, 426/398, 418, 419, 506, 524; 312/31.01–31.06, 31.1–31.3, 204, 205; 239/34, 44, 47, 51–53, 55–58; 206/204, 205; 53/14, 21

[56] References Cited

U.S. PATENT DOCUMENTS

| 855,984 | 6/1907 | Russell | 239/55 |
|---|---|---|---|
| 1,481,971 | 1/1924 | Whiting | 206/204 |
| 1,507,933 | 9/1924 | Roblin | 312/31.1 |
| 2,680,048 | 6/1954 | McDonald | 312/31.1 |
| 3,030,161 | 4/1962 | Bushong | 312/31.01 |
| 3,227,374 | 1/1966 | Valentine | 312/31.1 |
| 3,595,607 | 7/1971 | Gores | 239/57 |

Primary Examiner—Hiram H. Bernstein
Attorney, Agent, or Firm—Bacon & Thomas

[57] ABSTRACT

Perishable food and like comestibles are preserved and/or rejuvenated by the placement of such products, together with a moisture pod preferably isolated from direct physical contact therewith, into a container constructed of a substantially air-tight moisture impervious but readily cold permeable material, sealing the container, and subjecting the sealed package to conditions of refrigeration.

7 Claims, 12 Drawing Figures

U.S. Patent  Mar. 17, 1981  Sheet 1 of 2  4,256,770
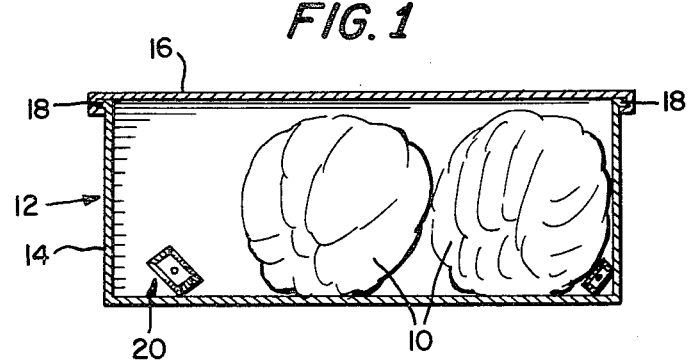
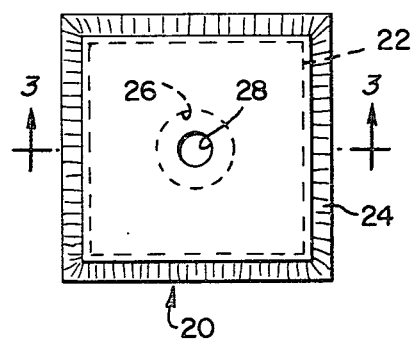
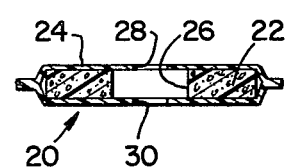
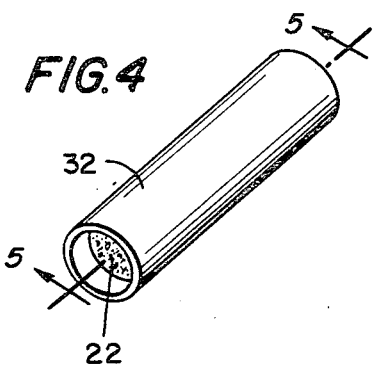
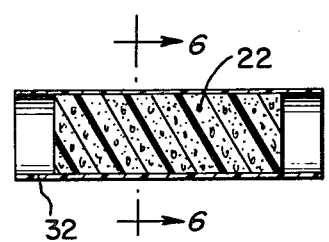
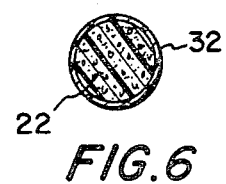
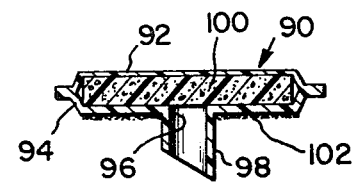

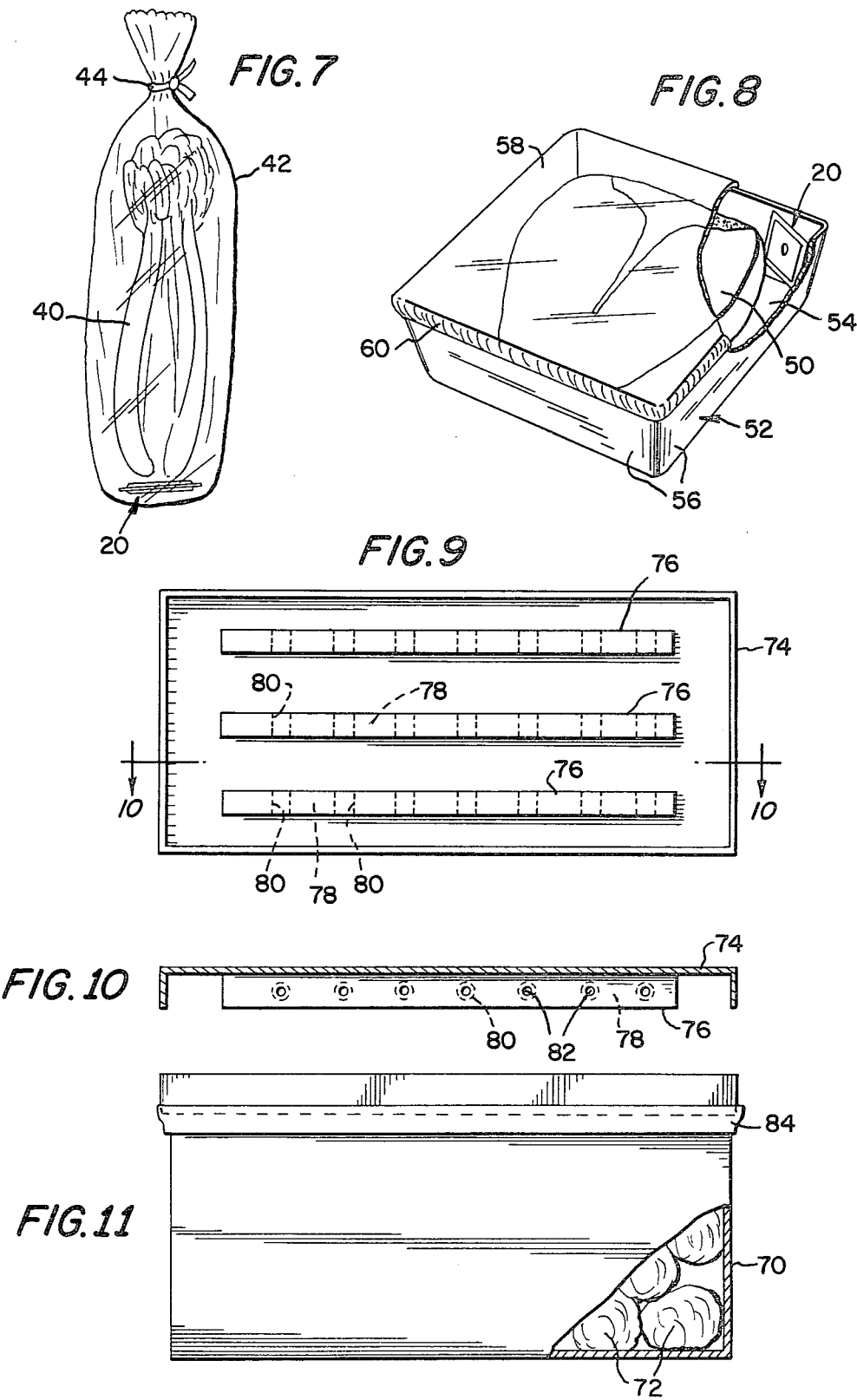

PRESERVATION OF PERISHABLE COMESTIBLES

This is a continuation application of prior application Ser. No. 698,932, filed on June 23, 1976, and now abandoned which, in turn, is a continuation of Ser. No. 522,144, filed on Nov. 8, 1974, and now abandoned which, in turn is a continuation of Ser. No. 394,810, filed Sept. 6, 1973 and now abandoned.

BACKGROUND OF THE INVENTION

1. Field of the Invention

The present invention relates generally to the conditioning of food and like products and, more particularly, to the preservation and/or rejuvenation of perishable comestibles for the purposes of extending the life of such products and enhancing their appearance and fresh, natural flavor.

2. Description of the Prior Art

It is of course well known in the prior art to provide for the preservation or protection of foodstuffs and similar perishable comestibles which typically become dehydrated, wilted or the like over prolonged periods of storage. Conventionally, various refrigeration techniques are thus employed to either prevent or retard dehydration by evaporation, and at the same time afford circulation of cold air, either dry or humid, about the perishable comestible.

Other known preservative techniques comprise (1) hydration, (2) humidification, (3) coating, glazing or packaging with water or other ice (e.g., dry ice), (4) coating, glazing or packaging with other agents as dessication and dehydration preventatives, (5) freezing, (6) pre-chilling, (7) special packaging, and (8) any combination of any of the above.

Exemplary of the known techniques for the preservation and protection of various perishable comestible products, compare U.S. Pat. Nos. 2,067,830; 2,088,319; 2,216,365; 2,262,327; 2,300,041; 2,317,397; 2,470,465; 2,846,318; 3,011,898; 3.059,442; 3,088,290; 3,193,392; 3,205,077; 3,320,075; 3,333,969; 3,342,613; 3,367,785; 3,419,400; 3,440,061; 3,465,873; 3,498,799; 3,600,200; and 3,625,713.

Nevertheless, in spite of the availability in the art of a multiplicity of techniques such as the above for the preservation or protection of foodstuffs and similar perishable comestibles, to date none has been found to be adequately sufficient or efficient to significantly extend the useful shelf-life of a given preserved comestible beyond a period of more than about several days.

SUMMARY OF THE INVENTION

Accordingly, it is a primary object of this invention to provide for the enhanced preservation and protection of a given perishable comestible product.

Another object of this invention is to provide a method for the preservation and protection of comestibles which overcomes those problems inherent in the techniques heretofore proposed.

Still another object of the invention is to provide an improved refrigeration technique whereby the useful shelf-life of a comestible product is markedly prolonged.

Yet another object of the invention is to provide an improved refrigeration technique which is capable, not only of combatting dehydration and deterioration of a perishable comestible product, but which is additionally capable of effecting the hydration or dehydration thereof, and which extends the useful shelf-life thereof by continuously supplying or adding rejuvenating moisture thereto, or by maintaining the moisture content thereof.

In obtaining the objects of this invention, one feature resides in sealing a given perishable comestible within a container fabricated from material which is substantially airtight, moisture impervious, but readily cold permeable, together with a moisture pod, which package is thence activated under conditions of refrigeration to combat dehydration and deterioration of the packaged comestible, and/or effect hydration or rehydration thereof, and/or to extend the useful shelf-life of such preserved comestible by continuously supplying or adding rejuvenating moisture thereto, or maintaining the moisture content thereof.

Other objects, features and advantages of this invention will become more apparent from the accompanying description when taken in conjunction with the accompanying drawings and wherein like reference numerals are used to indicate like or equivalent parts.

BRIEF DESCRIPTION OF THE DRAWINGS

In the drawings:

FIG. 1 is a schematic sectional view of a preferred embodiment of a perishable comestible product packaged in accordance with the present invention;

FIG. 2 is a plan view of the moisture pod or water vapor emitting element of the package of FIG. 1;

FIG. 3 is a sectional view taken along line 3—3 of FIG. 2;

FIG. 4 is a perspective view of a modified form of moisture pod or water vapor emitting element of the present invention;

FIG. 5 is a sectional view taken along line 5—5 of FIG. 4;

FIG. 6 is a sectional view taken along line 6—6 of FIG. 5;

FIG. 7 is a schematic elevational view of a modification of the comestible product package according to the present invention;

FIG. 8 is a schematic perspective view with parts cut away of another modification of the comestible product package of the present invention;

FIG. 9 is a bottom plan view of a container lid incorporating a moisture pod or water vapor emitting element in accordance with the present invention;

FIG. 10 is a sectional view taken along line 10—10 of FIG. 9;

FIG. 11 is an elevational view partially cut away of a comestible product container to which the lid of FIG. 9 is sealingly attached according to this invention; and FIG. 12 is a sectional view of a modular moisture pod or water vapor emitting element according to the invention.

DETAILED DESCRIPTION OF THE INVENTION

In one embodiment in accordance with the invention, as illustrated in FIG. 1, one or more heads of fresh lettuce 10, a readily perishable comestible, are placed within a package generally indicated at 12 comprising a receptacle 14 which is sealed by lid or cover member 16. Receptacle 14, cover 16, and consequently the package 12 are all fabricated from substantially moisture impermeable barrier material, such as cardboard, plastic, or the like, but which material, while providing an air-tight moisture barrier to ambient conditions, is not such as to establish a cold barrier between the interior of package 12 and ambient, and said material additionally, advantageously exhibiting controlled permeability to certain atmospheric gases such as air and molecular oxygen. Similarly, the continuous seal 18 between receptacle 14 and cover 16 is also such as to provide an air-tight moisture barrier to ambient conditions.

Also sealed within package 12 is at least one "moisture pod" generally indicated at 20 which will hereinafter be more fully described (see FIGS. 2-6). The moisture pod 20, as will hereinafter also be seen, is "activated" under conditions of refrigeration to combat dehydration and deterioration of the packaged comestible 10, and/or effect hydration or rehydration thereof, and/or to extend the useful shelf-life of such preserved comestible 10 by continuously supplying or adding rejuvenating moisture thereto, or maintaining the moisture content thereof.

The said "moisture pod" will now be described in detail. Referring specifically to the FIGS. 2 and 3, the moisture pod 20 comprises a sponge or otherwise absorbent or porous pad 22 which is saturated with water, preferably distilled water, and which thus defines a water reservoir capable, as will be seen from the description which follows, of activation when exposed to conditions of refrigeration such as to provide a highly humid atmosphere for the said comestible 10, and hence to supply same with that amount of moisture for preservation and/or rejuvenation according to the invention. The hydrated sponge or pad 22 is sealed in a preferably flexible water impervious envelope 24, e.g., a cellophane envelope which may be heat sealed or otherwise peripherally closed, such as to insure that, even in the event that the said moisture pod 20 becomes lodged, disposed, or otherwise brought contiguous the comestible 10, the sponge or pad reservoir 22 will not itself directly contact the said comestible 10, for it has additionally been found by applicant that any direct contact between reservoir 22 and comestible 10 is preferably avoided, since such contact will initiate (albeit probably somewhat slight only at the points of such contact) decay, wilting, browning, loss of bloom, rotting (e.g., stalk rot) or other deterioration or degradation of the said comestible 10. Stated differently, a storage labile comestible, refrigerated or otherwise, can tolerate no direct physical contact with either ice or water (other than water vapor) without initiating or enhancing at least to some extent at the point of such contact the aforesaid degradative phenomena. To insure that the said sponge 22 of the pod 20 and concomitantly the liquid water content thereof never directly contact the comestible 10, but which nevertheless permits of the venting of evolved water vapor therefrom both to the interior of the package 12 and to the available surface area of the comestible 10, the sponge 22, as illustrated in the FIGS. 2 and 3, is cut, drilled or punched such that an aperture or hole 26 extends completely therethrough, which hole 26 is in register with corresponding apertures, openings or holes 28 and 30 in either side of the sealed envelope 24. Most preferably, the hole 26 extending completely through the sponge 22 is significantly larger in diameter than both of the openings 28 and 30 in the envelope 24, such geometrical configuration absolutely insuring that the said sponge 22 never directly contacts the comestible 10.

Alternatively, the moisture pod 20 of the invention can be of the configuration illustrated in the FIGS. 4, 5 and 6, namely, a simple water impermeable plastic tube 32 open at either end and fabricated from such materials as polyethylene, polystyrene or polyvinyl chloride. The sponge or otherwise absorbent pad 22 component thereof, which, in use, is saturated with preferably distilled water, advantageously comprises a cylindrical plug of the sponge or otherwise absorbent material frictionally disposed within said tube 32 and laterally offset from the ends thereof, again, as in the embodiments of the FIGS. 2 and 3, to insure that the said sponge 22 will not itself directly contact the comestible 10.

Moreover, since it is only necessary that the pod 20 be of such construction as to insure a source of evolved water vapor to the interior of the package 12 and to the available surface area of the comestible 10, while at the same time preferably precluding any possibility of direct contact between the reservoir 22 component thereof and the said comestible 10, it will be appreciated that many and varied moisture pads having a variety of constructions, geometrical configurations and forms, both as to gross structure and extending to the individual elements thereof, and either similar or dissimilar to the pods illustrated in the FIGS. 2 to 6, can be utilized according to the invention. Therefore, "moisture pod" as used herein and in the claims which follow is to be construed consistent with the immediately aforesaid.

Thus, in accordance with this invention it has unexpectedly been found that by sealing a perishable comestible product in a moisture impervious, air-tight but cold permeable packaging member, together with a "moisture pod" adapted to continuously evolve that amount of water vapor needed for either hydration or rehydration of a given perishable comestible, or for continuously supplying or adding rejuvenating moisture thereto, or maintaining the moisture or water content thereof, while at the same time preferably precluding the possibility that the source of such evolved water vapor directly physically contact the said comestible within the sealed package, and thence by subjecting said sealed package to conditions of refrigeration (generally at a temperature of from greater than about 32° F. to less than about 60° F., (preferably between about 40° F. and 50° F.), said perishable comestible will neither degrade nor deteriorate over a prolonged period of time and its useful self-life will be markedly increased. Particularly in comparison with such well known prior art refrigeration, rejuvenation and/or preservation methods based on such principles as forced air pre-cooling; room cooling; hydro-cooling; vacuum cooling; package and top icing; product glazing, coating and/or icing; hydration; and/or humidification. While not wishing to be bound to any precise theory in explanation of the principles of the invention, it is currently believed that direct exposure to conditions of refrigeration, especially circulating and even humidified air, has the immediate effect of commencing dehydration of a given perishable comestible, albeit it is of course very well known that in the absence of such conditions of refrigeration, the dehydration phenomenon is markedly accelerated. In accordance with this invention, dehydration is further very significantly retarded by subjecting the perishable comestible to such conditions of refrigeration while physically isolated same therefrom in a moisture impermeable, air-tight, but readily cold pervious sealed container, which container is provided with its own source of moisture (or positive water vapor partial pressure) for preventing dehydration or even effecting hydration or rehydration of the thus packaged perishable comestible. According to the invention, the cold circulating air used for refrigeration never directly contacts and hence cannot dehydrate the said perishable comestible, and consistent therewith self-lives of the refrigerated products can be extended to a period of up to several weeks vis-a-vis a few hours or at most a day or two.

By "perishable comestible" herein and in the claims which follow, there is intended any vegetable, fruit, berry, nut, dairy product, bakery item, flower, meat (including meat, poultry, fish, and the like), food, edible product and the like which is subject to any one or more of the typical conditions of decay, degradation, deterioration and dehydration, or any other product (raw, processed or manufactured), the moisture or water content of which is advantageously controlled, either by hydration, rehydration, maintenance of existing levels of water content, or by reducing or retarding the effects of any dehydration thereof or moisture loss therefrom.

Referring now to FIG. 7, there is illustrated a modified form of the package according to the present invention in which an exemplary perishable comestible product in the form of a stalk of celery 40 is disposed within a preferably flexible, water impervious bag 42 open at one end thereof. Bag 42 may be constructed of any suitable material such as polyethylene of polyvinylidene chloride which, though water impervious, will not function as a cold barrier, i.e., is cold pervious, and is preferably transparent. Also disposed within bag 42 is a moisture pod 20 which may be of any type shown and described in connection with FIGS. 2-6 above. Bag 42 is sealed at its open end as by a conventional twist-type paper covered wire seal 44 such that a moisture barrier is established about the celery 40 similar to that discussed above with respect to the embodiment of FIG. 1.

In addition to the advantages and features of the present invention noted above, it can be readily appreciated that the package of FIG. 7 enables the establishment and maintenance of a moisture barrier about the various perishable comestible products placed therein from the moment the product is sealed in the bag until it is ultimately removed for consumption. In this manner, the product is unaffected by the many steps or events which occur in the chain of supply after the product has completed initial processing. In the case of celery, for example, once the celery is picked and cleaned, it may be sealed in bag 42 along with pod 20 and immediately refrigerated. Thereafter, transfer of the moisture-barrier protected stalk from the producer's refrigerator to that of a railroad boxcar and/or truck, a local distributor, an individual supermarket, and ultimately to the consumer's individual refrigerator will at no time cause the stalk to be subjected to dry, circulating air which would otherwise initiate dehydration or dessication of the product with concomitatnt flavor, moisture, texture and appearance loss. In a sense, the perishable comestible carried with it its own protective moisture barrier independent of the environment provided by each refrigerator within which it may be transported or stored to thereby optimize the conditions under which the comestible will be preserved or maintained in the vigorous, fresh and flavorful state it was in after initial processing.

Further, the present invention has proved to not only maintain or preserve the natural freshness of perishable comestibles but in addition to rejuvenate, revitalize and otherwise enhance the overall characteristics of these products at one time or another exposed to the effects of cold, dry air. For example, it has been found that a limp, wilted stalk of celery when packaged in accordance with the present invention and refrigerated for a period of time, e.g., overnight, will not only regain its crisp, fresh texture but will restore its full moisture content and original flavor. In fact, prolonged refrigeration of the packaged celery will initiate continued growth of the stalk, in essence bringing the same to life by stimulating natural rejuvenative processes occurring in the optimum environment within the package container. The consumer is by use of the package of FIG. 7, for example, thus provided with an expedient method of revitalizing and prolonging the useful life of purchased perishable comestibles which, unknown at the time of purchase, may be nearing the end of their conventionally projected lifetimes.

In FIG. 8, another modification of the package of the present invention is shown in connection with the preservation of the freshness and appearance of meat wherein a meat portion, such as a cut of beef 50, is disposed in a flexible or semi-rigid container 52 constructed of a moisture impervious, cold permeable material having a generally flat bottom 54 and upstanding side walls 56 contiguous therewith. Side walls 56 have a height greater than the thickness of the beef cut intended to be contained therein so as to support a lid, described below, in spaced relationship with the upper surface of the meat portion 50. Preferably, the bottom of the container is provided with upstanding ribs or other suitable spacing elements (not shown) to allow the moisture barrier to surround the underside of the meat portion 50. As in the embodiments of FIGS. 1 and 7, a moisture pod 20 is also disposed in container 52 with the pod preferably disposed upright in a corner of the package, as shown, although any other accommodating space is acceptable. A lid or cover member 58 closes the open upper side of the container 52 and includes a suitable lip 60 cooperatively engaging the upper peripheral edge of the container walls 56 to effectuate the desired moisture seal. It should be understood, of course, that any suitable cover may be employed such as a thin sheet of polyethylene or polyvinylidene chloride wrapped substantially about the container 52 and sealed therewith.

It is important to note that the package of FIG. 8 according to the present invention preserves and maintains the freshness and flavor of the meat product contained therein for the same reasons noted above and, in addition, allows the meat to retain its fresh bright red color or bloom. The package of FIG. 8 allows the moisture barrier developed by moisture pod 20 to encircle the meat portion 50 enabling the oxygen contained within the container to promote the development of oxymyoglobin which characterizes the bloom of fresh meat. Further, by providing a protective moisture barrier to isolate the meat portion 50 from exposure to the cold, circulating dry air of a refrigerator, the natural juices contained within the meat are retained thereby to insure the maintenance of full flavor and to preclude the collection of excessive meat weepage in the container which might otherwise promote the growth of bacteria and the like.

At this point, it is important to note that for each of the embodiments of FIGS. 1, 7 and 8, the moisture pod utilized therein is preferably constructed such that the envelope or sheath thereof is flexible whereupon the moisture pod readily accommodates the perishable comestible without bruising, cutting or in any way damaging the same. In this manner, the development of discolored or darkened areas on the surface of the perishable comestible product is avoided to thereby preserve and maintain the appetizing and appealing appearance of the comestible product while at the same time assuring the optimum preservation of its flavor, texture and overall freshness.

Referring to FIGS. 9-11, a relatively large packing container 70 of rectangular or other appropriate geometry is constructed of moisture impermeable but cold pervious material and has an open upper end to receive a substantial quantity of a perishable comestible product such as lettuce 72. A cover member 74 is constructed to cooperatively fit over the open upper end of container 70 and supports on an interior surface thereof a plurality of elongated generally rectangular moisture impermeable sheaths 76 aligned longitudinally in parallel as shown in FIG. 9. Disposed interiorly of sheaths 76 is a respective one of a like plurality of sponge or otherwise absorbent or porous moisture pads 78 having a number of holes or apertures 80, cut or drilled transversely therethrough at spaced intervals along their length. Sheaths 76 define a number of holes 82 in the longitudinal side walls thereof smaller than holes 80 and concentric therewith. Pads 78 are saturated with water, and cooperate with sheaths 78 to provide moisture pods exuding moisture for the purpose of establishing a water vapor partial pressure in the container.

Cover 74 is disposed atop container 70 and is sealed therewith by any suitable means such as a length of adhesive tape 84 having adhesive properties capable of perfecting and maintaining seal integrity in the cold environs of a refrigerator.

All of the properties, advantages and results heretofore described with respect to the preceeding embodiments will be likewise provided in the case of the container of FIGS. 9-11 and thus will not be again described for the sake of brevity.

In FIG. 12, a modular moisture pod 90 in accordance with the present invention is constructed in similar fashion to the moisture pod of FIGS. 2 and 3 with a flexible top sheet 92 of moisture impervious material, e.g., cellophane, which is peripherally attached as by heat sealing to a bottom sheet 94 of semi-rigid moisture impervious material having a central orifice 96. An open-ended conduit 98 which may be made of plastic or other suitable material is sealingly attached at its proximal end to bottom sheet 94 at orifice 96 to provide communication interiorly of the closed envelope formed by sheets 92 and 94. The distal end of conduit 98 is cut at an oblique angle, as shown in FIG. 12, such that the conduit will pierce and form a conforming aperture in the thin film covering of a conventional perishable comestible package as the modular pod is forced thereagainst. Disposed interiorly of the pod envelope is a sponge or otherwise absorbent or porous moisture absorbing pad 100 which is saturated with water. A thin adhesive layer 102 which may be a pressure sensitive adhesive normally protected by a coated paper is applied to sheet 94 such that the modular pod 90 will be securely attached to the conventional package covering for which it is used.

In its preferred form, the modular pod 90 of FIG. 12 is designed to be used in conjunction with a perishable comestible product packaged in a sealed moisture impervious container and to which it is desired to introduce a moisture source in accordance with the present invention. As can be appreciated, the modular pod 90 is first soaked or otherwise treated such that sponge element or moisture pad 100 is saturated with water and the paper backing, if any, removed to expose adhesive 102. The pod 90 is then forced against a wall of the container such that the oblique end of conduit 98 contacts and pierces the same while creating a conforming aperture therein. When the pod 90 is fully seated against the container wall, bottom sheet 91 will become engaged therewith such that the pod is secured thereon by adhesive 102. As described above, the moisture pod 90 will then, by communication through conduit 98, admit moisture to the sealed container so as to establish a water vapor partial pressure about the perishable comestible product contained therein. With refrigeration, the pod equipped package will exhibit all of the advantageous results described wth respect to the proceeding embodiments and will serve to reconstitute, rejuvenate and/or revitalize conventionally packaged perishable comestibles which may have already begun to wilt or deteriorate by reason of dehydration, dessication or other deteriorating factors.

Thus it can be appreciated that the present invention provides an economical package and moisture source for the preservation, moisture maintenance and enhancement of perishable comestible products in accordance with the method of this invention wherein a refrigerated product is isolated by a moisture barrier from direct impingement from cold, dry, circulating air whereby the product retains its full, natural flavor, texture, appearance, aroma and overall freshness to a degree not heretofore achieved.

While this invention has been described and illustrated with reference to certain preferred embodiments thereof, those skilled in the art will appreciate that various modifications, changes, omissions, and substitutions can be made without departing from the spirit of the invention. It is intended, therefore, that the invention be limited only by the scope of the following claims.

What is claimed is:

1. A perishable comestible package comprising:
   (i) a sealed, air-tight, cold permeable container;
   (ii) a perishable comestible product sealedly disposed within said container; and
   (iii) a self-contained source of water vapor sealedly disposed within said container, comprising:
      (a) a substantially flexible water laden porous element having an aperture therein, and,
      (b) a flexible envelope surrounding and substantially contiguous with said porous element whereby substantially all liquid water is confirmed within said porous element and having aperture means therein, for permitting continuous supplying of water vapor to said container while precluding direct contact between said porous element and said comestible.

2. The package as defined by claim 1 wherein said porous element is a sponge.

3. The package as defined by claim 1 in a condition of refrigeration.

4. The package as recited in claim 1, wherein the aperture means in said flexible envelope is in registration with the aperture in said porous element, and wherein the self-contained source of water vapor is nested within an accommodating void interiorly of said container whereby a continuous supply of water vapor is provided to the interior of said container without causing damage to said perishable comestible product.

5. The package as recited in claim 1 wherein said self-contained source of water vapor is nested within an accommodating void interiorly of said container without causing damage to said perishable comestible product.

6. The package as recited in claim 1 wherein said container is a flexible plastic bag having a sealable opening through which said perishable comestible product and said distillery may pass.

7. A perishable comestible package comprising:
(i) a sealed, air-tight, cold permeable container;
(ii) a perishable comestible product sealedly disposed within said container; and
(iii) a self-contained source of water vapor exteriorly attached to and interiorly communicating through a wall of said container, said source of water vapor comprising:
(a) a substantially flexible water laden porous element;
(b) a flexible envelope surrounding and substantially contiguous with said porous element, and having an aperture therein; and,
(c) a tubular conduit attached at its proximal end to said envelope in registry with said aperture and having a cutting edge for piercing said container formed at its distal end, whereby a continuous supply of water vapor is provided to the interior of said container.

* * * * *